US012694734B2

(12) United States Patent
Lingala et al.

(10) Patent No.: US 12,694,734 B2
(45) Date of Patent: Jul. 28, 2026

(54) METHOD AND SYSTEM FOR VERIFYING USER AUTHENTICITY IN AN ACCESS CONTROL SYSTEM

(71) Applicant: Honeywell International Inc., Charlotte, NC (US)

(72) Inventors: Ramesh Lingala, Hyderabad (IN); Yuri Novozhenets, Pittsford, NY (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 81 days.

(21) Appl. No.: 18/420,871

(22) Filed: Jan. 24, 2024

(65) Prior Publication Data

US 2024/0249572 A1 Jul. 25, 2024

Related U.S. Application Data

(60) Provisional application No. 63/481,559, filed on Jan. 25, 2023.

(51) Int. Cl.

*G10L 17/24* (2013.01)
*G07C 9/00* (2020.01)
*G07C 9/26* (2020.01)

(52) U.S. Cl.

CPC ..... *G07C 9/00182* (2013.01); *G07C 9/00563* (2013.01); *G07C 9/26* (2020.01); *G07C 2009/00198* (2013.01)

(58) Field of Classification Search

CPC ...... G07C 2009/00198; G07C 2209/63; G07C 9/00182; G07C 9/00563; G07C 9/26;

(Continued)

(56) References Cited

U.S. PATENT DOCUMENTS 6,041,410 A 3/2000 Hsu et al.
6,213,391 B1 4/2001 Lewis (Continued)

FOREIGN PATENT DOCUMENTS

AU 2005319019 A1 6/2006
AU 2007243473 A1 11/2007

(Continued)

OTHER PUBLICATIONS

Extended European Search Report and Search Opinion received for EP Application No. 24153386.8, mailed on Jun. 14, 2024, 10 pages.

*Primary Examiner* — Dionne Pendleton
(74) *Attorney, Agent, or Firm* — Seager, Tufte & Wickhem, LLP

(57) ABSTRACT

In an implementation, a method may include detecting a user is in proximity to an access reader based on one of a command received from the user or an electronic communication device, associated with the user, present within a predefined threshold distance from the access reader. Further, the method may include transmitting a signal to the electronic communication device in response to detecting that the user is in proximity to the access reader, where the signal is indicative of verifying the authenticity of the user. Further, the method may include receiving, from the electronic communication device, biometric information associated with the user for verifying the authenticity of the user after transmitting the signal to the electronic communication device and verifying the authenticity of the user based on the verification of the biometric information with user data stored at a database in communication with the access reader.

16 Claims, 9 Drawing Sheets

(58) Field of Classification Search

CPC ...... G07C 2009/00261; G07C 9/00571; G07C 9/257; G07C 9/27; G07C 9/00309; G07C 9/37; G07C 9/38; G07C 2209/08; G07C 9/00904; G07C 9/32; G07C 2009/00412; G07C 2009/00769; G07C 9/00174; G07C 9/00857; G07C 9/20; G07C 9/33; G07C 2009/00793; G07C 2009/00825; G07C 2009/00841; G07C 2209/04; G07C 9/00674; G07C 9/00817; G07C 9/22; G07C 9/23; G07C 9/25; G07C 9/253; G07C 9/28; H04L 63/0861; H04L 63/10; H04L 63/102; H04L 63/0853; H04L 2209/56; H04L 63/107; H04L 9/0872; H04L 9/3231; H04L 9/3263; H04L 2463/082; H04L 63/0428; H04L 63/0492; H04L 63/08; H04L 67/12; H04L 67/125; H04L 2209/805; H04L 2209/24; H04L 2209/72; H04L 9/3226; H04L 9/3236; H04L 9/3242; H04L 9/3247; H04L 9/3268; H04L 9/3271; H04L 2209/043; H04L 2209/88; H04L 63/062; H04L 63/068; H04L 63/0807; H04L 9/0825; H04L 9/0833; H04L 9/085; H04L 9/0866; H04L 9/32; H04L 9/3213; H04L 9/3273; H04L 9/50; H04W 12/06; H04W 12/35; H04W 12/47; H04W 12/50; H04W 12/71; H04W 12/08; H04W 4/80; H04W 4/12; H04W 4/02; H04W 12/63; H04W 12/64; H04W 12/02; H04W 12/065; H04W 4/026; H04W 4/029; H04W 4/14; H04W 4/90; H04W 88/02; H04W 12/33; H04W 12/61; H04W 12/04; H04W 12/068; H04W 12/082; H04W 4/023; H04W 4/025; H04W 48/04; G08C 17/02; G07F 17/32; G07F 17/3218; G07F 17/3239; G07F 9/001; G07F 7/1008; G06Q 20/108; G06Q 20/20; G06Q 20/322; G06Q 20/3276; G06Q 20/3278; G06Q 20/36; G06Q 30/0226; G06Q 30/0241; G06Q 30/0253; G06Q 30/06; G06Q 20/40145; G06Q 20/3223; G06Q 20/4014; G06Q 20/3224; G06Q 40/00; G06Q 20/341; G06Q 20/346; G06Q 10/02; G06Q 10/06; G06Q 10/10; G06Q 20/102; G06Q 20/401; G06Q 2220/00; G06Q 30/0185; G06Q 50/20; G06Q 50/265; G10L 15/22; G10L 17/00; G10L 17/24; G10L 2015/223; A61B 5/0205; A61B 5/02438; A61B 5/117; A61B 5/6898; H04M 2203/553; H04M 2250/10; H04M 1/72412; H04M 1/72415; H04M 2250/02; G08B 21/22; G08B 25/008; G08B 25/016; G08B 27/006; B60R 25/252; G06V 40/172; G06V 20/52; G06V 40/166; G06V 40/15; G06V 40/25; G06V 40/70; G06V 40/1347; G06V 10/60; G06V 10/764; G06V 10/82; G06V 40/11; G06V 40/12; G06V 40/1341; G06V 40/50; G06V 10/993; G06V 40/10; G06V 40/107; G06V 40/1306; G06V 40/1312; G06V 40/1353; G06V 40/1359; G06V 40/1365; G06V 40/1394; G06V 40/14; G06V 40/55; G06F 21/32; G06F 21/34; G06F 21/35; G06F 3/013; G06F 18/256; G06F 18/21; G06F 21/316; G06F 21/31; G06F 21/45; G06F 2221/2111; H04N 2201/3226; H04N 2201/3233; H04N 2201/3236; H04N 2201/3239; H04N 2201/3281; H04N 1/32106; H04N 1/2112; H04N 1/32128; H04N 1/4406; H04N 1/442; H04N 1/444; H04N 2101/00; H04N 2201/0084; H04N 2201/3205; H04N 2201/3238; H04N 2201/3277; H04N 23/611; G06N 20/00; G06N 3/044; G06N 3/0442; G06N 3/045; G06N 3/0464; G06N 3/08; G06N 3/09

See application file for complete search history.

(56) References Cited

U.S. PATENT DOCUMENTS

| | | | | |
|---|---|---|---|---|
| 7,766,223 | B1 | 8/2010 | Mello et al. | |
| 8,499,164 | B2 | 7/2013 | Ortiz et al. | |
| 8,806,610 | B2 | 8/2014 | Draluk et al. | |
| 8,912,880 | B2 | 12/2014 | Ritter | |
| 8,953,851 | B2 | 2/2015 | Inkumsah et al. | |
| 9,084,115 | B2 | 7/2015 | Abraham | |
| 9,100,826 | B2 | 8/2015 | Weiss | |
| 9,160,743 | B2 | 10/2015 | Anantharaman | |
| 9,195,817 | B2 | 11/2015 | Scully-Power et al. | |
| 9,298,905 | B1 | 3/2016 | Giobbi | |
| 9,775,044 | B2 | 9/2017 | Jangi | |
| 9,801,058 | B2 | 10/2017 | Tali et al. | |
| 9,830,495 | B2 | 11/2017 | Slaby et al. | |
| 10,075,846 | B1 | 9/2018 | Acar et al. | |
| 10,108,961 | B2 | 10/2018 | Wang et al. | |
| 10,140,441 | B2 | 11/2018 | Cheng et al. | |
| 10,154,031 | B1 | 12/2018 | Lerner | |
| 10,154,410 | B2 | 12/2018 | Jakobsson | |
| 10,225,737 | B1 | 3/2019 | Mulders | |
| 10,304,267 | B2 | 5/2019 | Ashenfelter et al. | |
| 10,390,222 | B2 | 8/2019 | Khosravi et al. | |
| 10,623,958 | B2 | 4/2020 | Kremer et al. | |
| 10,637,854 | B2 | 4/2020 | Lerner | |
| 10,701,067 | B1 | 6/2020 | Ziraknejad et al. | |
| 10,789,799 | B2 | 9/2020 | Leonard et al. | |
| 10,832,245 | B2 | 11/2020 | Weiss | |
| 10,922,399 | B2 | 2/2021 | Mohammad et al. | |
| 10,931,667 | B2 | 2/2021 | Krishan | |
| 11,050,738 | B1 | 6/2021 | Barakat et al. | |
| 11,256,906 | B2 | 2/2022 | Son et al. | |
| 11,302,336 | B2 * | 4/2022 | Langenberg ............. | G07C 9/22 |
| 11,803,633 | B1 | 10/2023 | Beatson et al. | |
| 11,874,909 | B1 | 1/2024 | Kocher et al. | |
| 12,008,572 | B2 | 6/2024 | Walters et al. | |
| 12,050,676 | B2 | 7/2024 | Andersen | |
| 12,135,770 | B2 | 11/2024 | Jhnssen et al. | |
| 2003/0037264 | A1 | 2/2003 | Ezaki et al. | |
| 2005/0114654 | A1 | 5/2005 | Brackett et al. | |
| 2007/0282754 | A1 | 12/2007 | Owen et al. | |
| 2008/0026727 | A1 | 1/2008 | Jeon et al. | |
| 2008/0052528 | A1 | 2/2008 | Poo et al. | |
| 2008/0209545 | A1 | 8/2008 | Asano | |
| 2009/0152343 | A1 | 6/2009 | Carter et al. | |
| 2009/0158423 | A1 | 6/2009 | Orlassino et al. | |
| 2010/0115591 | A1 | 5/2010 | Kane-Esrig | |
| 2010/0217709 | A1 | 8/2010 | Aabye et al. | |
| 2011/0202994 | A1 | 8/2011 | Hicks et al. | |
| 2012/0218078 | A1 | 8/2012 | Hill | |
| 2012/0233681 | A1 | 9/2012 | Adams et al. | |
| 2012/0293303 | A1 | 11/2012 | Khan et al. | |
| 2013/0024374 | A1 | 1/2013 | Weiss | |
| 2013/0127591 | A1 | 5/2013 | Shay et al. | |
| 2013/0198021 | A1 | 8/2013 | Gandhi et al. | |
| 2014/0090039 | A1 | 3/2014 | Bhow | |
| 2014/0229388 | A1 | 8/2014 | Pereira et al. | |
| 2014/0250512 | A1 | 9/2014 | Goldstone et al. | |
| 2014/0279528 | A1 | 9/2014 | Slaby et al. | |
| 2014/0283016 | A1 | 9/2014 | Sambamurthy et al. | |

(56) References Cited

U.S. PATENT DOCUMENTS

| | | | | |
|---|---|---|---|---|
| 2015/0015365 | A1 | 1/2015 | Ortiz et al. | |
| 2015/0066822 | A1 | 3/2015 | Li et al. | |
| 2015/0172287 | A1 | 6/2015 | Ortiz et al. | |
| 2015/0178489 | A1 | 6/2015 | Nakano et al. | |
| 2015/0186871 | A1* | 7/2015 | Laracey | G06Q 20/322 705/41 |
| 2015/0195288 | A1 | 7/2015 | Hoyos et al. | |
| 2015/0242601 | A1 | 8/2015 | Griffiths et al. | |
| 2015/0269372 | A1 | 9/2015 | Stevens | |
| 2015/0288688 | A1 | 10/2015 | Derakhshani | |
| 2015/0347732 | A1 | 12/2015 | Alameh et al. | |
| 2016/0012217 | A1 | 1/2016 | Wolf et al. | |
| 2016/0034901 | A1 | 2/2016 | Ferren | |
| 2016/0055694 | A1 | 2/2016 | Saeedi et al. | |
| 2016/0065571 | A1 | 3/2016 | Hoyos et al. | |
| 2016/0197916 | A1 | 7/2016 | Ravindran et al. | |
| 2016/0210454 | A1 | 7/2016 | Chou | |
| 2016/0321627 | A1 | 11/2016 | Mccracken et al. | |
| 2016/0378963 | A1 | 12/2016 | Anderson | |
| 2017/0323300 | A1 | 11/2017 | Weiss | |
| 2017/0323301 | A1 | 11/2017 | Weiss | |
| 2017/0353861 | A1 | 12/2017 | Kremer et al. | |
| 2017/0372321 | A1 | 12/2017 | Weiss | |
| 2018/0014195 | A1 | 1/2018 | John et al. | |
| 2018/0033013 | A1 | 2/2018 | Park et al. | |
| 2018/0046789 | A1 | 2/2018 | Vissa et al. | |
| 2018/0089691 | A1 | 3/2018 | Sibert et al. | |
| 2018/0103341 | A1 | 4/2018 | Moiyallah et al. | |
| 2018/0145975 | A1 | 5/2018 | Jakobsson | |
| 2018/0211022 | A1 | 7/2018 | Wagner et al. | |
| 2019/0130085 | A1 | 5/2019 | Jung et al. | |
| 2019/0171806 | A1 | 6/2019 | Embrechts et al. | |
| 2019/0236251 | A1 | 8/2019 | Yang et al. | |
| 2019/0386988 | A1 | 12/2019 | Segura et al. | |
| 2020/0028843 | A1 | 1/2020 | Watson et al. | |
| 2020/0089851 | A1 | 3/2020 | Kumar et al. | |
| 2020/0128396 | A1* | 4/2020 | Mars | H04W 12/50 |
| 2020/0145827 | A1 | 5/2020 | Roy et al. | |
| 2020/0167482 | A1 | 5/2020 | Han et al. | |
| 2020/0267553 | A1 | 8/2020 | Wagner et al. | |
| 2020/0280557 | A1 | 9/2020 | Ravi et al. | |
| 2020/0342086 | A1 | 10/2020 | Oung et al. | |
| 2021/0133303 | A1 | 5/2021 | Toumazou et al. | |
| 2021/0150008 | A1 | 5/2021 | Reimann | |
| 2021/0183235 | A1* | 6/2021 | Giobbi | G07F 17/3239 |
| 2021/0334347 | A1 | 10/2021 | White | |
| 2021/0374218 | A1 | 12/2021 | Humborstad et al. | |
| 2021/0385653 | A1 | 12/2021 | Sau et al. | |
| 2022/0058256 | A1 | 2/2022 | Lee | |
| 2022/0229895 | A1 | 7/2022 | Ranjan et al. | |
| 2022/0245224 | A1 | 8/2022 | Rojas et al. | |
| 2022/0414194 | A1 | 12/2022 | Jhnssen et al. | |
| 2023/0084139 | A1 | 3/2023 | Mckell-Redwood et al. | |
| 2023/0120591 | A1 | 4/2023 | Kato | |
| 2023/0133210 | A1 | 5/2023 | Hammad et al. | |
| 2023/0179594 | A1 | 6/2023 | Through. et al. | |
| 2023/0351826 | A1 | 11/2023 | Prostko et al. | |
| 2023/0409685 | A1 | 12/2023 | Tussy | |
| 2024/0095317 | A1 | 3/2024 | Lynch | |
| 2024/0127645 | A1 | 4/2024 | Swaminathan | |
| 2024/0249572 | A1 | 7/2024 | Lingala et al. | |

FOREIGN PATENT DOCUMENTS

| | | | |
|---|---|---|---|
| AU | 2011202930 | A1 | 7/2011 |
| AU | 2019200642 | A1 | 2/2019 |
| AU | 2017330439 | A1 | 3/2019 |
| AU | 2019387477 | A1 | 7/2021 |
| AU | 2021202184 | A1 | 11/2021 |
| AU | 2022435296 | A1 | 8/2024 |
| BR | 102014007032 | A2 | 12/2015 |
| CA | 2463379 | A1 | 10/2004 |
| CA | 2509119 | A1 | 2/2006 |
| CA | 2989940 | A1 | 2/2017 |
| CA | 3094897 | A1 | 10/2019 |
| CA | 3022117 | A1 | 4/2020 |
| CN | 101552675 | A | 10/2009 |
| CN | 103369533 | A | 10/2013 |
| CN | 103914645 | A | 7/2014 |
| CN | 106255973 | A | 12/2016 |
| CN | 107181756 | A | 9/2017 |
| CN | 108521645 | A | 9/2018 |
| CN | 108629167 | A | 10/2018 |
| CN | 208596409 | U | 3/2019 |
| CN | 109726530 | A | 5/2019 |
| CN | 109922201 | A | 6/2019 |
| CN | 110263520 | A | 9/2019 |
| CN | 110944082 | A | 3/2020 |
| CN | 111199031 | A | 5/2020 |
| CN | 212135473 | U | 12/2020 |
| CN | 113656776 | A | 11/2021 |
| CN | 114154137 | A | 3/2022 |
| CN | 117093968 | A | 11/2023 |
| DE | 102004047739 | A1 | 2/2006 |
| DE | 102015212618 | A1 | 1/2017 |
| DE | 102015114367 | A1 | 3/2017 |
| DE | 102017116780 | A1 | 2/2018 |
| DE | 102012220130 | B4 | 4/2019 |
| DE | 102019001674 | A1 | 9/2020 |
| DE | 102022131642 | A1 | 6/2023 |
| EP | 1614318 | A1 | 1/2006 |
| EP | 2493231 | A2 | 8/2012 |
| EP | 2145287 | B1 | 8/2013 |
| EP | 2710825 | A2 | 3/2014 |
| EP | 2962237 | A1 | 1/2016 |
| EP | 3089063 | A1 | 11/2016 |
| EP | 3108397 | A1 | 12/2016 |
| EP | 3243155 | A1 | 11/2017 |
| EP | 3314496 | A1 | 5/2018 |
| EP | 3486822 | A1 | 5/2019 |
| EP | 3497952 | A1 | 6/2019 |
| EP | 3509040 | A1 | 7/2019 |
| EP | 3374852 | B1 | 1/2020 |
| EP | 3625729 | A1 | 3/2020 |
| EP | 3695635 | A1 | 8/2020 |
| EP | 3740888 | A1 | 11/2020 |
| EP | 3966714 | A1 | 3/2022 |
| EP | 4220453 | A1 | 8/2023 |
| EP | 4258141 | A1 | 10/2023 |
| EP | 3855403 | B1 | 3/2024 |
| EP | 4332922 | A1 | 3/2024 |
| EP | 3624036 | B1 | 8/2024 |
| GB | 2342744 | A | 4/2000 |
| GB | 2464903 | A | 5/2010 |
| GB | 2495571 | A | 4/2013 |
| GB | 2594814 | A | 11/2021 |
| IN | 200807105 | P4 | 8/2009 |
| IN | 305033 | | 2/2018 |
| IN | 201741015015 | | 11/2018 |
| IN | 201711026765 | | 3/2019 |
| IN | 201947047244 | | 11/2019 |
| IN | 202041018003 | | 10/2020 |
| IN | 202341037735 | | 6/2023 |
| JP | 3222110 | B2 | 10/2001 |
| JP | 2003-178032 | A | 6/2003 |
| JP | 7037355 | B2 | 3/2022 |
| JP | 2023-079046 | A | 6/2023 |
| JP | 2023-177047 | A | 12/2023 |
| JP | 7414873 | B2 | 1/2024 |
| JP | 7582458 | B2 | 11/2024 |
| KR | 10-1428350 | B1 | 9/2014 |
| KR | 10-2017-0085041 | A | 7/2017 |
| KR | 10-2020-0121670 | A | 10/2020 |
| KR | 10-2608994 | B1 | 12/2023 |
| MX | 2011003056 | A | 7/2011 |
| SG | 118552 | B | 7/2008 |
| SG | 10201703837 | A1 | 12/2018 |
| TH | 10912 | U | 12/2015 |
| TW | 201317826 | A | 5/2013 |
| TW | 1543012 | B | 7/2016 |
| TW | M604915 | U | 12/2020 |
| VN | 98943 | A | 11/2023 |
| WO | 99/03070 | A1 | 1/1999 |

(56) References Cited

FOREIGN PATENT DOCUMENTS

| | | | |
|---|---|---|---|
| WO | 2004/068283 | A2 | 8/2004 |
| WO | 2006/034449 | A2 | 3/2006 |
| WO | 2006/034927 | A1 | 4/2006 |
| WO | 2007/011311 | A2 | 1/2007 |
| WO | 2007/103298 | A2 | 9/2007 |
| WO | 2008/110597 | A2 | 9/2008 |
| WO | 2009/013526 | A1 | 1/2009 |
| WO | 2009/031159 | A2 | 3/2009 |
| WO | 2009/070430 | A2 | 6/2009 |
| WO | 2009/123779 | A1 | 10/2009 |
| WO | 2011/112752 | A1 | 9/2011 |
| WO | 2012/096749 | A2 | 7/2012 |
| WO | 2014/075944 | A1 | 5/2014 |
| WO | 2014/106728 | A1 | 7/2014 |
| WO | 2015/051253 | A2 | 4/2015 |
| WO | 2015/062382 | A1 | 5/2015 |
| WO | 2015/114215 | A1 | 8/2015 |
| WO | 2015/117674 | A1 | 8/2015 |
| WO | 2015/147383 | A1 | 10/2015 |
| WO | 2015/153688 | A1 | 10/2015 |
| WO | 2016/070872 | A1 | 5/2016 |
| WO | 2016/082229 | A1 | 6/2016 |
| WO | 2016/150028 | A1 | 9/2016 |
| WO | 2016/150154 | A1 | 9/2016 |
| WO | 2017/036455 | A2 | 3/2017 |
| WO | 2017/181198 | A1 | 10/2017 |
| WO | 2018/205168 | A1 | 11/2018 |
| WO | 2018/207079 | A1 | 11/2018 |
| WO | 2019/045678 | A1 | 3/2019 |
| WO | 2019/186041 | A1 | 10/2019 |
| WO | 2020/101630 | A1 | 5/2020 |
| WO | 2020/182334 | A1 | 9/2020 |
| WO | 2021/016617 | A1 | 1/2021 |
| WO | 2021/094774 | A1 | 5/2021 |
| WO | 2022/055693 | A1 | 3/2022 |
| WO | 2022/114711 | A1 | 6/2022 |
| WO | 2022/149376 | A1 | 7/2022 |
| WO | 2022/237550 | A1 | 11/2022 |
| WO | 2023/138801 | A1 | 7/2023 |
| WO | 2023/194031 | A1 | 10/2023 |
| WO | 2024/052330 | A1 | 3/2024 |
| WO | 2024/254643 | A1 | 12/2024 |

* cited by examiner

METHOD AND SYSTEM FOR VERIFYING USER AUTHENTICITY IN AN ACCESS CONTROL SYSTEM

CROSS REFERENCE TO RELATED APPLICATION

This application claims the benefit of U.S. Provisional Patent Application No. 63/481,559 filed on Jan. 25, 2023, which is incorporated by reference herein in its entirety.

FIELD OF THE INVENTION

The disclosure generally relates to an access control system, and more specifically related to a method and a system for verifying user authenticity in the access control system.

BACKGROUND

One of the key decisions a user has to make when installing or upgrading a security system for business or personal use is how to handle access control systems. Each access control system may have its own distinct set of features, advantages, and disadvantages. For example, organizations may use one or more of card readers and key cards as their primary form of access control, keypad readers in conjunction with physical key cards (card readers) to increase security, or biometric readers. However, these methods may have multiple shortcomings.

SUMMARY

This summary is provided to introduce a selection of concepts, in a simplified format, that are further described in the detailed description of the disclosure. This summary is neither intended to identify key or essential inventive concepts of the disclosure nor is it intended for determining the scope of the disclosure.

Disclosed herein is a method at an access reader for verifying authenticity of a user. The method includes detecting, by the access reader, that the user is in proximity to the access reader based on one of a command received from the user or an electronic communication device, associated with the user, present within a predefined threshold distance from the access reader. Furthermore, the method includes transmitting a signal to the electronic communication device in response to detecting that the user is in proximity to the access reader, wherein the signal is indicative of verifying the authenticity of the user. Furthermore, the method includes receiving, from the electronic communication device, biometric information associated with the user for verifying the authenticity of the user after transmitting the signal to the electronic communication device. Furthermore, the method includes verifying, by the access reader, the authenticity of the user based on the verification of the biometric information with user data stored in a database in communication with the access reader.

In one or more embodiments, the method includes triggering a command to provide access to the user based on the verification of the authenticity of the user.

In one or more embodiments, the method includes recording, by the access reader at the database, an access log associated with the verification of the authenticity of the user.

In one or more embodiments, the method includes establishing a secure wireless communication link with the access reader, wherein the wireless communication link is one of a Bluetooth communication link, Ultra-wideband communication link, or another near-field communication link.

In one or more embodiments, receiving the biometric information comprises receiving a voice signature from the user.

Also disclosed herein is a method at the electronic communication device for verifying the authenticity of the user. The method includes generating a prompt message for the user to confirm whether to access the access reader within a vicinity of the electronic communication device. Furthermore, the method includes receiving an input associated with biometric information of the user to access the access reader in response to the generation of the prompt message. Furthermore, the method includes transmitting, to the access reader, the input associated with the biometric information of the user, wherein the biometric information is verified by the access reader to provide access to the access reader.

In one or more embodiments, prior to generating the prompt message, the method includes receiving a signal from the access reader based on the reception of one of a command received from the user or the electronic communication device, associated with the user, present within a predefined threshold distance from the access reader, wherein the signal is indicative of verifying the authenticity of the user.

In one or more embodiments, receiving the input from the user to access the access reader comprises receiving an identity of the access reader, from among the plurality of access readers.

In one or more embodiments, the method includes establishing the secure wireless communication link with the access reader, wherein the wireless communication link is one of the Bluetooth or Ultra-wideband communication link(s).

Also disclosed herein is a system at an access reader for verifying the authenticity of the user. The system includes an access control engine coupled with a processor and a memory. The access control engine is configured to detect that the user is in proximity to the access reader based on one of the command received from the user or the electronic communication device, associated with the user, present within the predefined threshold distance from the access reader. Furthermore, the access control engine is configured to transmit the signal to the electronic communication device in response to detecting that the user is in proximity to the access reader, wherein the signal is indicative of verifying the authenticity of the user. Furthermore, the access control engine is configured to receive, from the electronic communication device, biometric information associated with the user for verifying the authenticity of the user after transmitting the signal to the electronic communication device. Furthermore, the access control engine is configured to verify the authenticity of the user based on the verification of the biometric information with user data stored in a database in communication with the access reader.

In one or more embodiments, the access control engine is configured to trigger a command to provide access to the user based on the verification of the authenticity of the user.

In one or more embodiments, the access control engine is configured to record, by the access reader at the database, an access log associated with the verification of the authenticity of the user.

In one or more embodiments, the access control engine is configured to establish a secure wireless communication link with the access reader, wherein the wireless communication link is one of a Bluetooth communication link, Ultra-wideband communication link, or another near-field communication link.

In one or more embodiments, the access control engine is configured to receive the biometric information, the access control engine is further configured to receive a voice signature from the user.

Also disclosed herein is a system at the electronic communication device for verifying the authenticity of a user. The system includes an access control engine coupled with a processor and a memory. The access control engine is configured to generate the prompt message for the user to confirm whether to access the access reader within the vicinity of the electronic communication device. Furthermore, the access control engine is configured to receive the input associated with biometric information of the user to access the access reader in response to the generation of the prompt message. Furthermore, the access control engine is configured to transmit, to the access reader, the input associated with the biometric information of the user, wherein the biometric information is verified by the access reader to provide access to the access reader.

In one or more embodiments, the access control engine is configured to, prior to generation of the prompt message, receive a signal from the access reader based on the reception of one of a command received from the user or the electronic communication device, associated with the user, present within a predefined threshold distance from the access reader, wherein the signal is indicative of verifying the authenticity of the user.

In one or more embodiments, the access control engine is configured to receive the input from the user to access the access reader, the access control engine is configured to receive an identity of the access reader, from among the plurality of access readers.

In one or more embodiments, the access control engine is configured to establish a secure wireless communication link with the access reader, wherein the wireless communication link is one of a Bluetooth or Ultra-wideband communication link(s).

To further clarify the advantages and features of the methods, systems, and apparatuses, a more particular description of the methods, systems, and apparatuses will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail in the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

Figure 1:
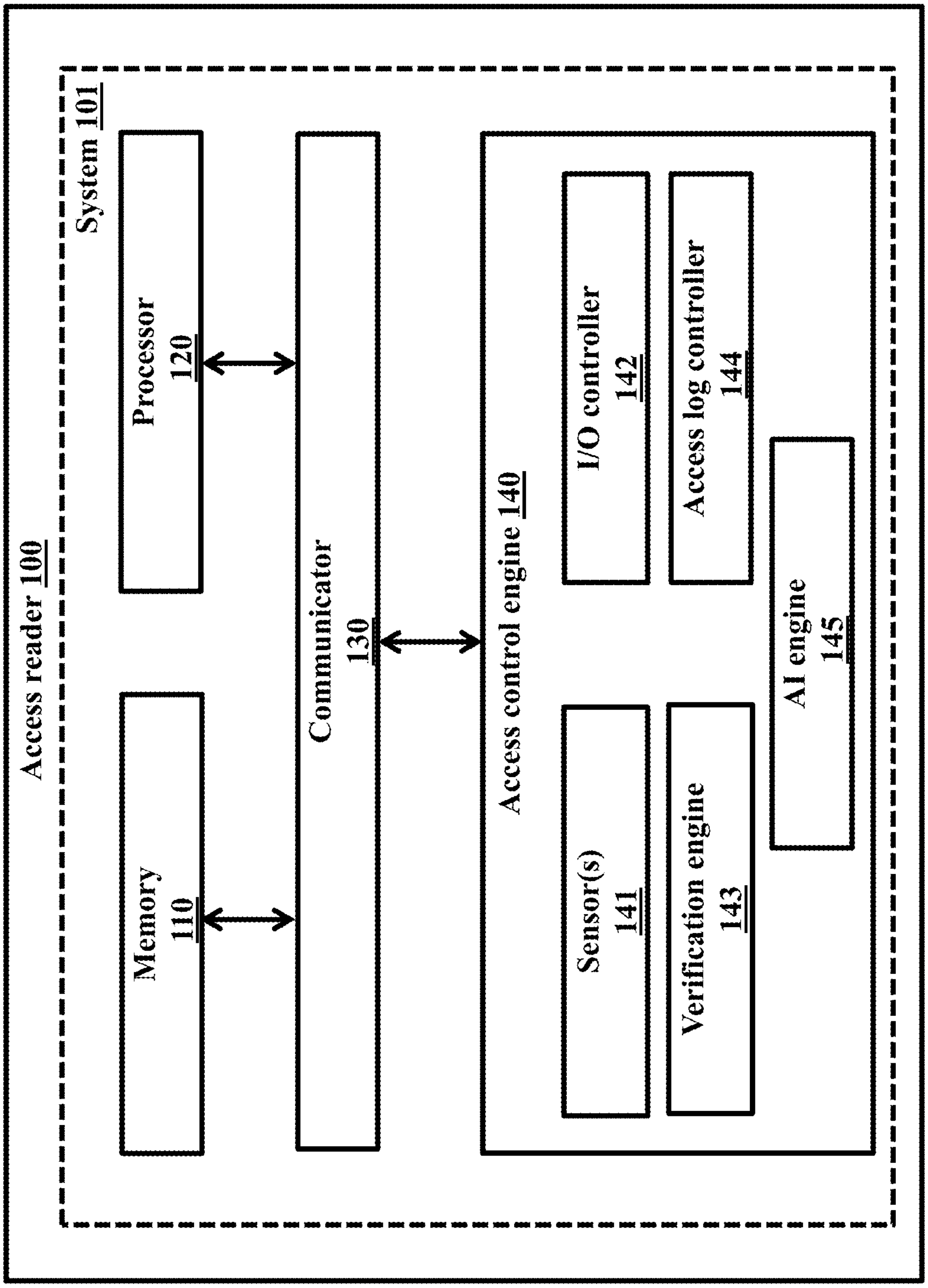
FIG. 1 illustrates a block diagram of an access reader for verifying user authenticity in an access control system.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION OF FIGURES

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "In one or more embodiments", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

One of the key decisions a user has to make when installing or upgrading a security system for business or personal use is how to handle access control systems. The term "access control system" refers to physical or technological security measures that govern entrances and exits from spaces within and around a building. The access control system includes everything from a physical lock on a door to a key card/electronic device that opens specific storage areas. There are several options for access control readers when installing the access control system (e.g., card readers, keypad readers, two-factor or multifactor authentication readers, biometric readers, etc.). Each access control system has its own distinct set of features, advantages, and disadvantages.

For example, in one scenario, many organizations use card readers as their primary form of access control. To gain access, card readers use key cards rather than physical keys or codes. There are two types of access control key card readers, viz., proximity and magnetic. Both of these key card options enable organizations to view a history of which cards are used at which entry points, making it simple to narrow down users in the event of a security incident. The disadvantage of using key card readers is that users can easily lose or lend their cards, making an organization's security less effective. In another scenario, keypad readers can be used in conjunction with physical key cards (card readers) to increase security. These are referred to as two-factor or multifactor authentication readers. Although two-factor authentication is more secure than a single access control reader, even this type of access control can be hacked with a stolen card and personal identification number (PIN). In another scenario, biometric readers such as fingerprints would be used for access control rather than key cards or PIN numbers. Biometric access control, especially when combined with another type of access control reader, is by far the most effective form of security for organizations seeking the ultimate in access control. Although biometric readers are effective, they are also more expensive than others. Another disadvantage of using fingerprints to prove identity and gain access is the resulting high-touch surface, which may pose a sanitation issue and become an uninvited source of virus and bacteria transmission.

In some scenarios, the user may be unable to tap the card readers/electronic device and/or provide the fingerprint and/or use face recognition mechanism to the access control system to gain access to entrances and exits from the spaces within and around the building for a variety of reasons, including having bags in both hands, lab devices in both hands, speaking to another person, and so on. The present disclosure addresses the above-mentioned disadvantages or other shortcomings or at least provide a useful alternative for verifying user authenticity in the access control system.

Referring now to the drawings, and more particularly to FIGS. 1 to 7B, where similar reference characters denote corresponding features consistently throughout the figures, there are shown preferred embodiments.

FIG. 1 illustrates a block diagram of an access reader 100 for verifying user authenticity in an access control system. Examples of the access reader 100 include, but not limited to card readers, keypad readers, two-factor or multifactor authentication readers, biometric readers, etc.

In an embodiment, the access reader 100 may include a system 101. The system 101 may include a memory 110, a processor 120, a communicator 130, and an access control engine 140.

In an embodiment, the memory 110 may store instructions to be executed by the processor 120 for verifying authenticity of a user, as discussed throughout the disclosure. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted that the memory 110 is non-movable. In some examples, the memory 110 can be configured to store larger amounts of information than the memory. In certain examples, a non-transitory storage medium may store data that can, over time, change (e.g., in Random Access Memory (RAM) or cache). The memory 110 can be an internal storage unit, or it can be an external storage unit of the access reader 100, a cloud storage, or any other type of external storage.

The processor 120 may communicate with the memory 110, the communicator 130, and the access control engine 140. The processor 120 may be configured to execute instructions stored in the memory 110 and to perform various processes for verifying authenticity of the user, as discussed throughout the disclosure. The processor 120 may include one or a plurality of processors, which may be a general-purpose processor, such as, a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 130 may be configured to communicate internally between internal hardware components and with external devices (e.g., server, electronic communication device, etc.) via one or more networks (e.g., radio technology, bluetooth, bluetooth low energy (BLE), wireless fidelity (Wi-Fi), etc.), as described in conjunction with FIG. 5, FIG. 6, FIG. 7A, and FIG. 7B. The communicator 130 may include an electronic circuit specific to a standard that enables wired or wireless communication. Furthermore, the communicator 130 may transmit a signal to an electronic communication device when the user is in proximity to the access reader 100, where the signal is indicative of verifying the authenticity of the user. Furthermore, the communicator 130 may receive biometric information associated with the user for verifying the authenticity of the user after transmitting the signal to the electronic communication device.

The access control engine 140 may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the access control engine 140 may include a sensor(s) 141, an input-output (I/O) controller 142, a verification engine 143, an access log controller 144, and an AI engine 145.

Figure 7A:
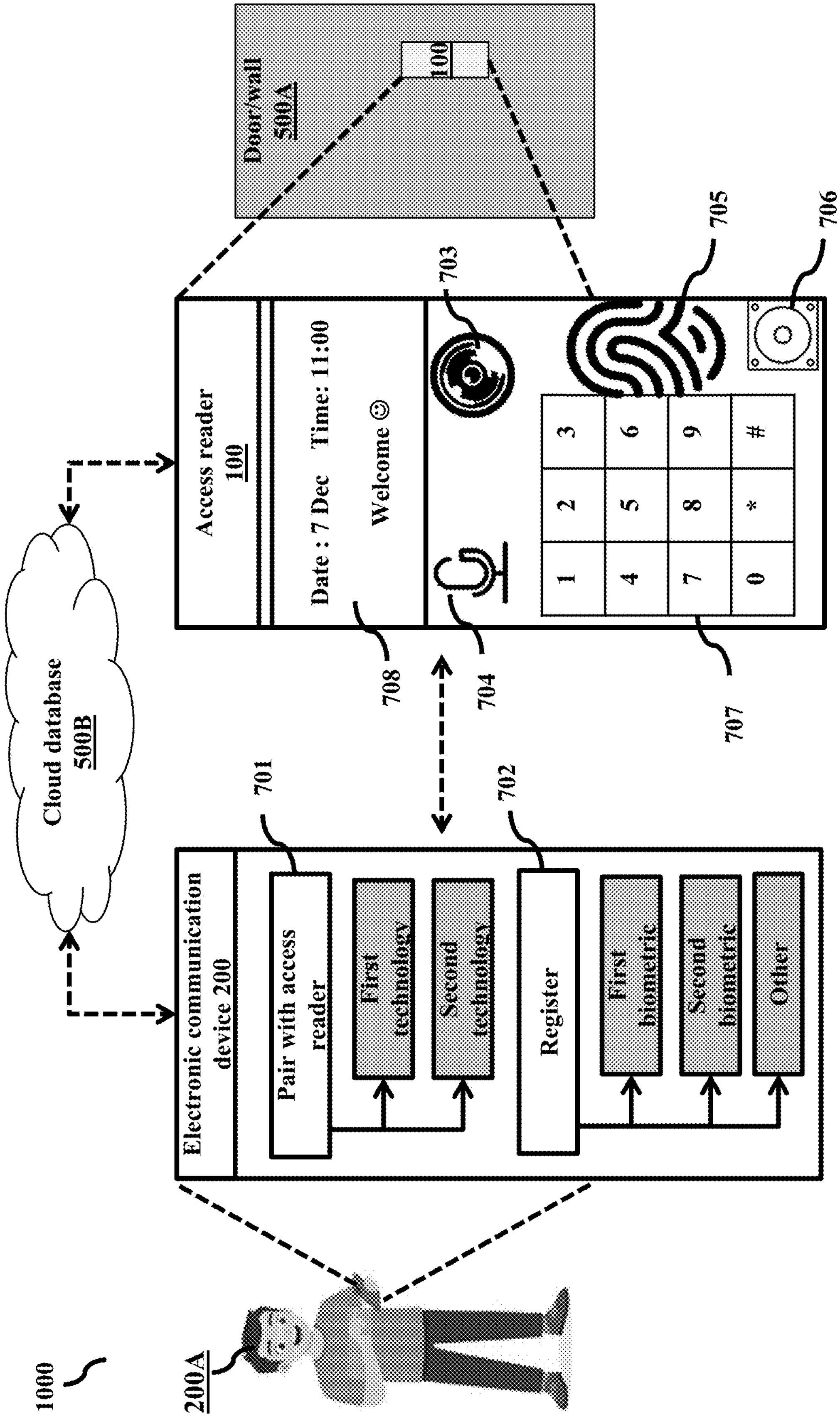
FIGS. 7A-7B is an exemplary scenario illustrating the method for verifying user authenticity in the access control system.
Figure 7B:
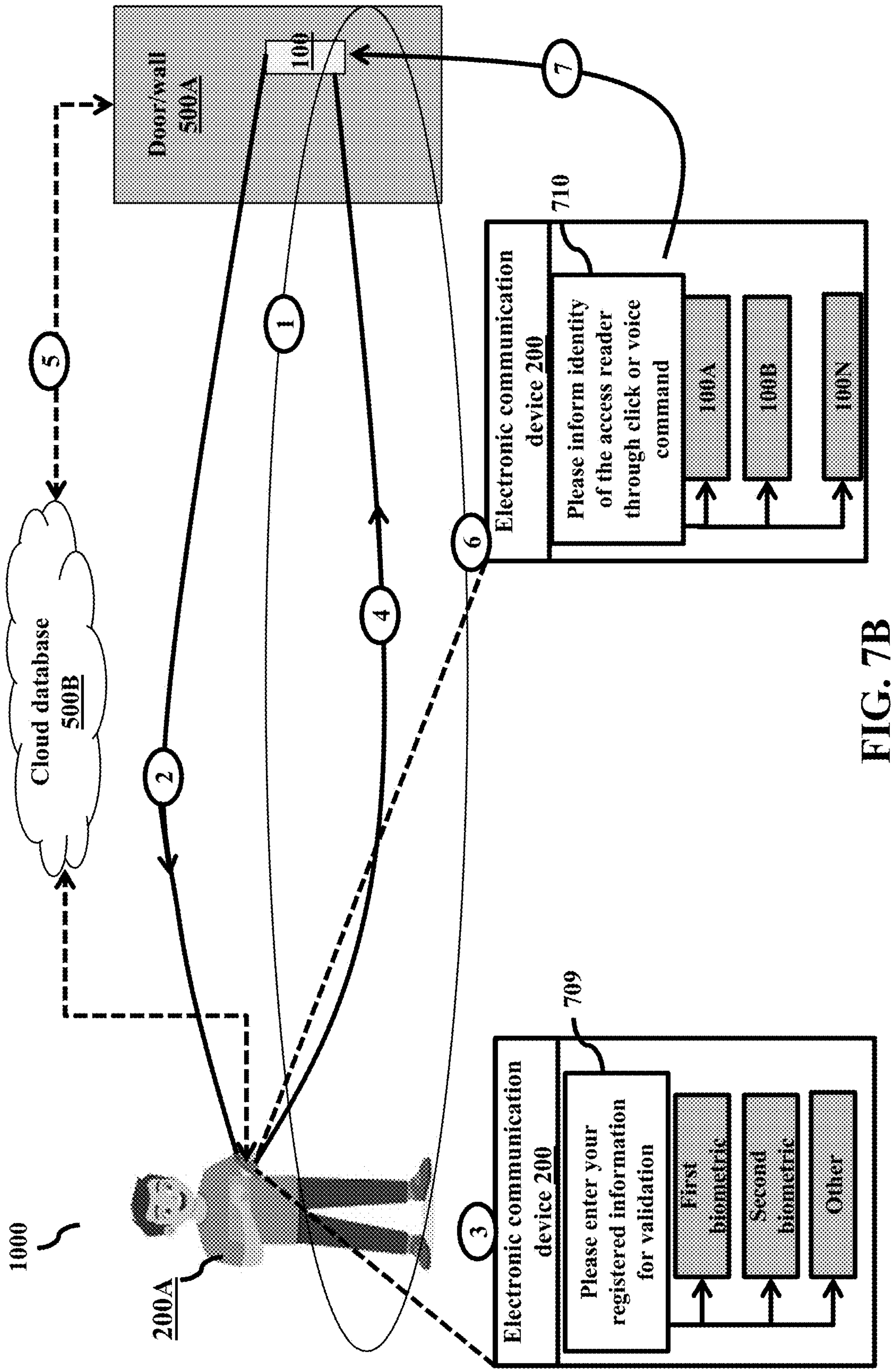

The sensor(s) 141 may be configured to capture sensor data associated with the access reader 100. Examples of the sensor(s) 141 include, but not limited to, a camera, a microphone, a temperature sensor, an audio sensor, an accelerometer, a pressure sensor, a location sensor, a humidity sensor, a global positioning system (GPS) sensor, a magnetic field sensor, an electric field sensor, a light sensor, an infrared light sensor, a proximity sensor, a biometric sensor (e.g., fingerprint, iris, facial pattern, etc.), and so on, as illustrated in FIG. 7A and FIG. 7B. The sensor data is, for example, a signal transmitted by the sensor(s) 141 in response to physical stimulation. In another embodiment, the access reader 100 may take a security-related action based on the security-related data of the sensors(s) 141. The security-related sensor data or action is data, or an action related to controlling or restricting access to an area protected by the access reader 100. An example of the area protected by the access reader 100 is the inside of an object whose access is controlled or restricted by an apparatus, such as a door, gate, lid, drawer, etc., that can be secured and locked in a closed position by the access reader 100 that is coupled to the apparatus. The object includes a house, a building, an automobile, a safe, a container, a cabinet, and so on.

In one example embodiment, the security-related data for a motion sensor may indicate the motion of the door, gate, lid, drawer, or other apparatus to which the access reader 100 is connected. The motion of the door or other apparatus indicates that the door or other apparatus is being opened/closed to allow/restrict access to the area.

In one example embodiment, the security-related data for a proximity sensor may indicate that the user is near a door and may attempt to break/open through the door, that the door is closed or open based on its proximity to a door frame in which the door is installed, and so on. Furthermore, the proximity sensor's security-related data includes a count of users who pass by the access reader 100 and the number of users who enter or exit the protected area. Furthermore, the sensor(s) 141 sends a message indicating the counts to the owner or administrator of the access reader 100/access log controller 144, a third party, etc.

In one example embodiment, the security-related data for a microphone may indicate that a user is knocking on the door. When the microphone may determine that the user is knocking on the door, the microphone then sends a signal to a wirelessly connected light sensor/light bulb, causing the light bulb to illuminate an area near the access reader 100. For example, the light bulb can illuminate the area in front of the door, the area inside the house containing the door, and so on.

In one example embodiment, the security-related data for the proximity sensor may indicate that the user is within a predetermined distance/predefined threshold distance (e.g., 2 meters) of the access reader 100, the access reader 100 may initiate a video stream to the administrator/owner of the access reader 100 via the camera and an audio stream via the microphone to the administrator/owner of the access reader 100. The administrator/owner uses the video stream to see what is going on near the door, and the access reader 100 may use a two-way audio stream to communicate with the user who is nearby.

In one example embodiment, the security-related data may indicate a potential security issue in which the access reader 100 communicates via a signal to be sent to a speaker/audio sensor, causing the speaker to emit an alarm sound. In another case, when security-related data indicates a potential security issue, the access reader 100 may send a signal that causes the camera to start recording or taking images, for example, to capture an image or video of a burglar attempting to break into the area protected by the access reader 100.

Figure 5:
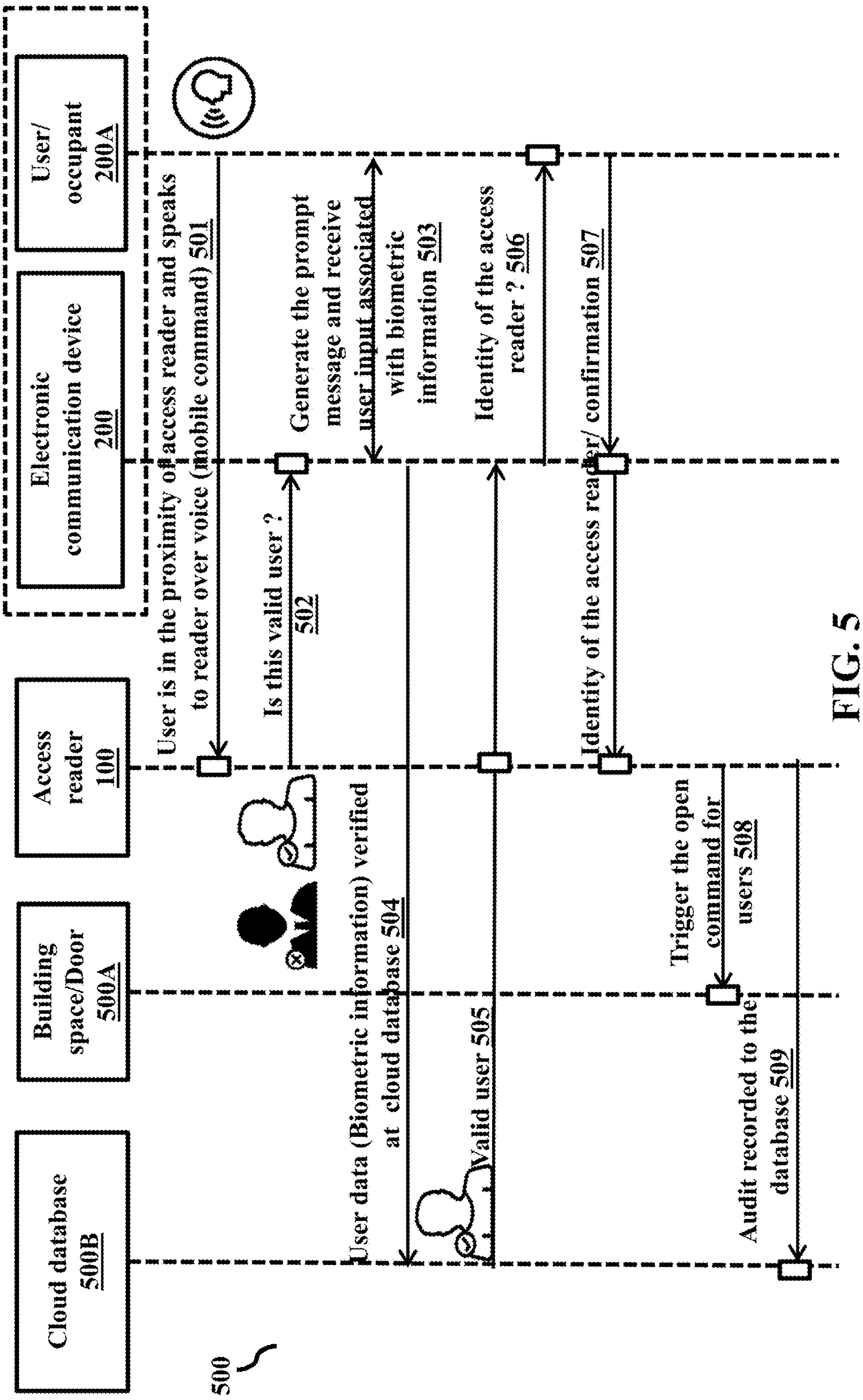
FIG. 5 is an example sequence diagram illustrating the method for verifying user authenticity in the access control system.

The I/O controller 142 may include an input device(s) and an output device(s). The input device(s) allows the user to communicate with the access reader 100, as illustrated in FIG. 5, FIG. 7A, and FIG. 7B. Examples of input devices include, but not limited to, a keypad, a camera, a microphone, and so on. The user may enter a password, passcode, or other information using the keypad. When the camera is used as the input device(s), the camera recognizes the user's face or other identifiable body parts, as well as physical gestures used for communication. When the input device(s) is/are a microphone, the user can speak commands, passwords, passphrases, and so on, which the microphone receives and speech or voice recognition can be used to understand the words spoken, identify the user, and so on.

The verification engine 143 may verify the authenticity of the user based on verification of the biometric information with user data stored at a database (e.g., cloud server) (not shown in FIG. 1) in communication with the access reader 100, as described in conjunction with FIG. 5, FIG. 7A, and FIG. 7B. The biometric information may include a voice signature (e.g., voice command to open the door, "please open the door") from the user. The verification engine 143 may establish a secure wireless communication link, by utilizing the communicator 130, with the access reader 100, wherein the wireless communication link is one of a Bluetooth communication link, ultra-wideband communication link, or another near-field communication link. The access log controller 144 may record an access log associated with the verification of the authenticity of the user in the database.

A function associated with the AI engine 145 may be performed through the non-volatile memory, the volatile memory, and the processor 120. One or a plurality of processors controls the processing of the input data in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/or may be implemented through a separate server/system. The learning algorithm is a method for training a predetermined target device (for example, a robot) using a plurality of learning data to cause, allow, or control the target device (e.g., access reader 100) to decide or predict the authenticity of the user. Examples of learning algorithms include, but not limited to, supervised learning, unsupervised learning, semi-supervised learning, or reinforcement learning.

The AI engine 145 may consist of a plurality of neural network layers. Each layer has a plurality of weight values and performs a layer operation through a calculation of a previous layer and an operation of a plurality of weights. Examples of neural networks include, but not limited to, convolutional neural network (CNN), deep neural network (DNN), recurrent neural network (RNN), restricted boltzmann machine (RBM), deep belief network (DBN), bidirectional recurrent deep neural network (BRDNN), generative adversarial networks (GAN), and deep Q-networks.

Although FIG. 1 shows various hardware components of the access reader 100, but it is to be understood that other embodiments are not limited thereon. In other embodiments, the access reader 100 may include less or more number of components. Further, the labels or names of the components are used only for illustrative purpose and does not limit the scope of the invention. One or more components can be combined to perform the same or substantially similar functions to verify the authenticity of the user in the access control system.

Figure 2:
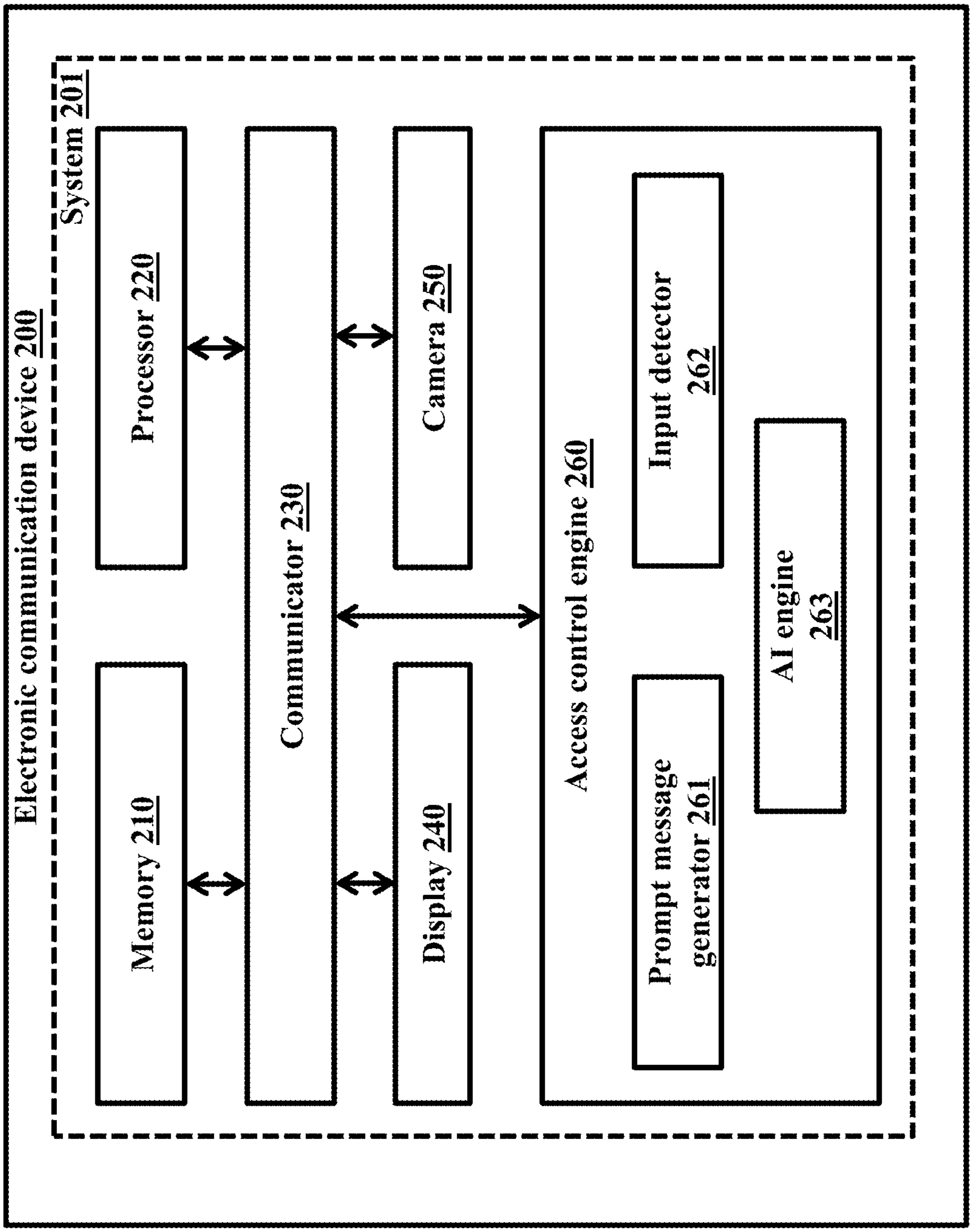
FIG. 2 illustrates a block diagram of an electronic communication device for verifying the user authenticity in the access control system.

FIG. 2 illustrates a block diagram of an electronic communication device 200 for verifying user authenticity in the access control system. Examples of the electronic communication device 200 include, but not limited to, a smartphone, a tablet computer, a Personal Digital Assistance (PDA), an Internet of Things (IoT) device, a wearable device, etc.

In an embodiment, the electronic communication device 200 may include a system 201. The system 201 may include a memory 210, a processor 220, a communicator 230, a display 240, a camera 250, and an access control engine 260.

In an embodiment, the memory 210 may store instructions to be executed by the processor 220 for verifying authenticity of the user, as discussed throughout the disclosure. The memory 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 210 may, in some examples, be considered a non-transitory storage medium. The term "non-transitory" may indicate that the storage medium is not embodied in a carrier wave or a propagated signal. However, the term "non-transitory" should not be interpreted that the memory 210 is non-movable. In some examples, the memory 210 can be configured to store larger amounts of information than the memory. In certain examples, a non-transitory storage medium may store data that can, over time, change (e.g., in Random Access Memory (RAM) or cache). The memory 210 can be an internal storage unit, or it can be an external storage unit of the electronic communication device 200, a cloud storage, or any other type of external storage.

The processor 220 may communicate with the memory 210, the communicator 230, the display 240, the camera 250, and the access control engine 260. The processor 220 may be configured to execute instructions stored in the memory 210 and to perform various processes for verifying authenticity of the user, as discussed throughout the disclosure. The processor 220 may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator 230 may be configured to communicate internally between internal hardware components and with external devices (e.g., access reader 100) via one or more networks (e.g., radio technology), as illustrated in FIG. 5, FIG. 6, FIG. 7A, and FIG. 7B. The communicator 230 may include an electronic circuit specific to a standard that enables wired or wireless communication.

The display 240 can accept user inputs and is made of a liquid crystal display (LCD), a light emitting diode (LED), an organic light emitting diode (OLED), or another type of display, as illustrated in FIG. 7A, and FIG. 7B. The user inputs may include, but not limited to, touch, swipe, drag, gesture, voice command, and so on. The camera 250 may include one or more image sensors (e.g., charged coupled device (CCD), complementary metal-oxide semiconductor (CMOS)) to capture one or more images/image frames.

The access control engine 260 may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the access control engine 260 may include a prompt message generator 261, an input detector 262, and an AI engine 263. The prompt message generator 261 may generate a prompt message (e.g., voice message, display message, etc.) for the user to confirm whether to access the access reader 100 within a vicinity of the electronic communication device 200, as illustrated in FIG. 5. Prior to generating the prompt message, receiving, by the communicator 230, a signal from the access reader 100 based on the reception of one of a command (e.g., open the door) received from the user or the electronic communication device 200, associated with the user, present within the predefined threshold distance from the access reader 100, where the signal is indicative of verifying the authenticity of the user.

The input detector 262 may receive an input (e.g., voice signature) associated with the biometric information of the user to access the access reader 100 in response to the generation of the prompt message, as described in conjunction with FIG. 5, and FIG. 7A. Furthermore, the input detector 262 may receive the input from the user to access the access reader 100 including receiving an identity of the access reader 100 (e.g., Door-1), from among the plurality of access readers (100*n*) (e.g., Door-1 to Door-n), not shown in FIG. 2. The communicator 230 then may transmit the input associated with the biometric information of the user to the access reader 100, where the biometric information is verified by the access reader 100 to provide access to the access reader 100, as illustrated in FIG. 5, FIG. 6, FIG. 7A, and FIG. 7B. The communicator 230 may establish the secure wireless communication link with the access reader 100, where the wireless communication link is, for example, one of the Bluetooth or ultra-wideband communication link(s).

A function associated with the AI engine 263 may be performed through the non-volatile memory, the volatile memory, and the processor 220. One or a plurality of processors controls the processing of the input data (e.g., voice signature) in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/or may be implemented through a separate server/system. The learning algorithm is a method for training a predetermined target device (for example, a robot) using a plurality of learning data to cause, allow, or control the target device to decide or predict. Examples of learning algorithms include, but not limited to, supervised learning, unsupervised learning, semi-supervised learning, or reinforcement learning.

The AI engine 263 may consist of a plurality of neural network layers. Each layer has a plurality of weight values and performs a layer operation through a calculation of a previous layer and an operation of a plurality of weights. Examples of neural networks include, but not limited to, convolutional neural network (CNN), deep neural network (DNN), recurrent neural network (RNN), restricted boltzmann machine (RBM), deep belief network (DBN), bidirectional recurrent deep neural network (BRDNN), generative adversarial networks (GAN), and deep Q-networks.

Although FIG. 2 shows various hardware components of the electronic communication device 200, but it is to be understood that other embodiments are not limited thereon. In other embodiments, the electronic communication device 200 may include less or more number of components. Further, the labels or names of the components are used only for illustrative purpose and does not limit the scope of the invention. One or more components can be combined to perform the same or substantially similar functions to verify the authenticity of the user in the access control system.

Figure 3A:
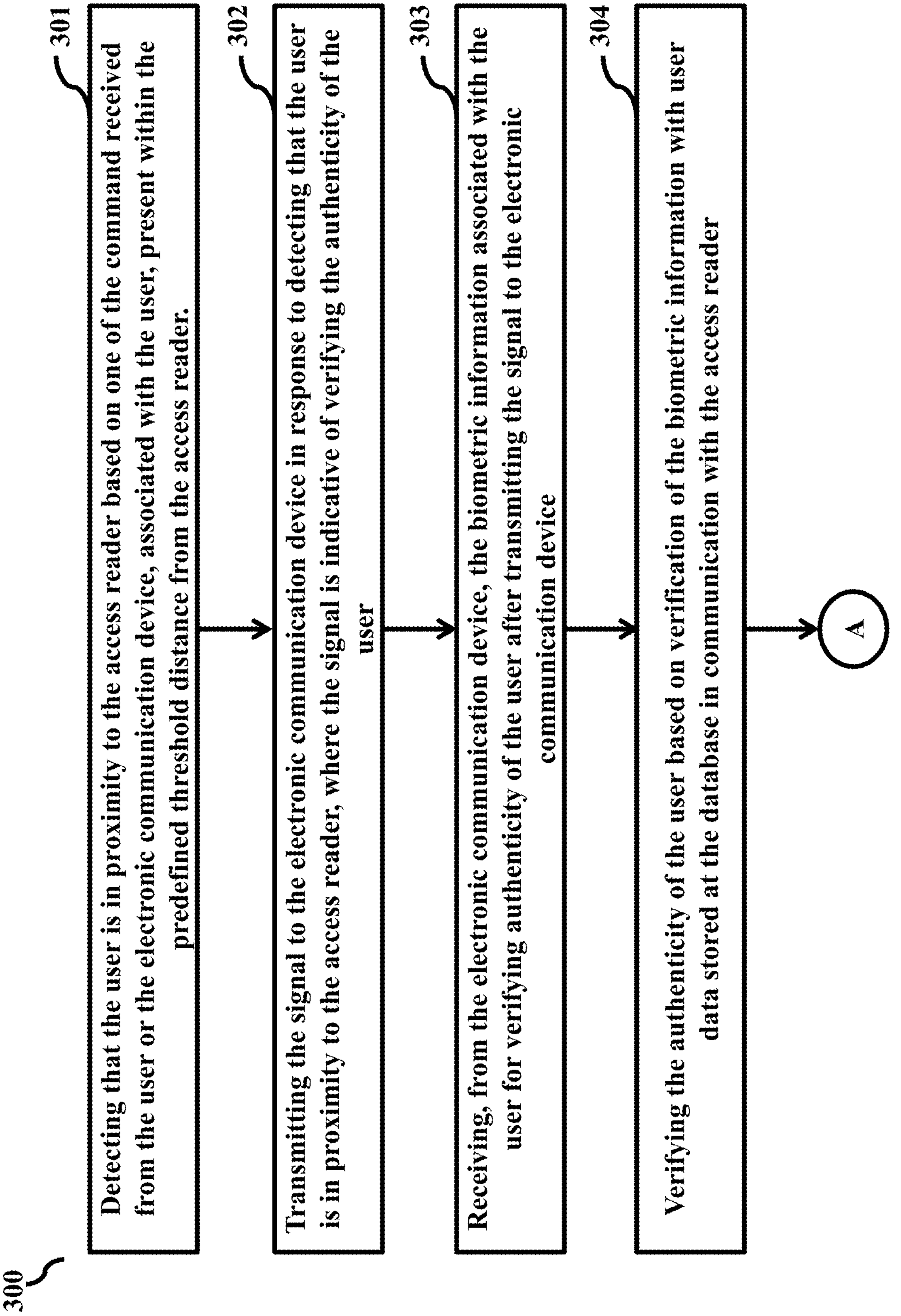
FIGS. 3A-3B is a flow diagram illustrating a method at the access reader for verifying user authenticity in the access control system.
Figure 3B:
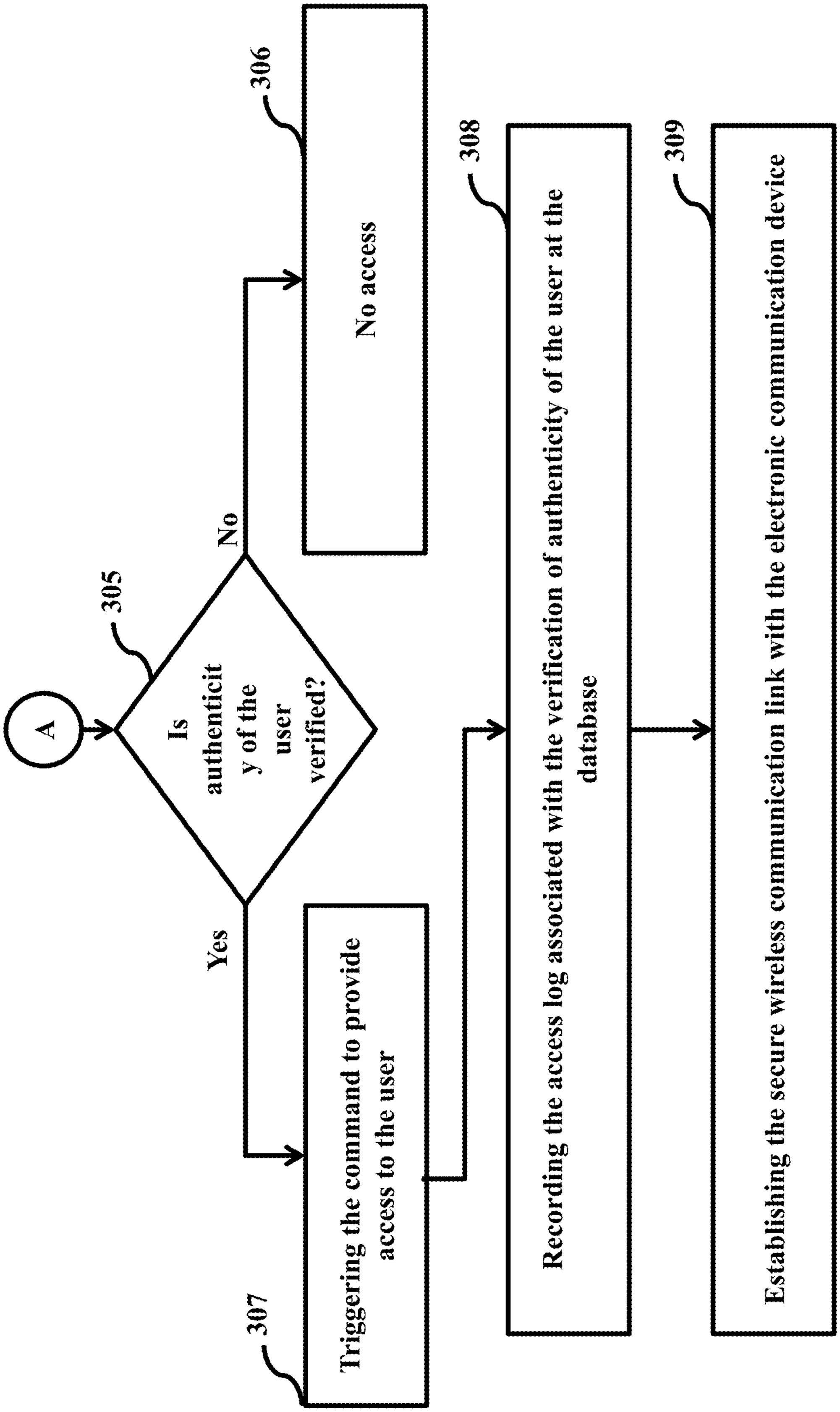

FIGS. 3A-3B is a flow diagram illustrating a method 300 at the access reader 100 for verifying user authenticity in the access control system. Steps (301 to 309) may be performed by the access reader 100 to verify the authenticity of the user in the access control system.

At step 301, the method 300 may include detecting that the user is in proximity to the access reader 100 based on one of the command(s) received from the user or the electronic communication device 200, associated with the user, present within the predefined threshold distance from the access reader 100, as illustrated in FIG. 5 and FIG. 7B.

At step 302, the method 300 may include transmitting the signal to the electronic communication device 200 in response to detecting that the user is in proximity to the access reader 100, where the signal is indicative of verifying the authenticity of the user, as illustrated in FIG. 5 and FIG. 7B.

At step 303, the method 300 may include receiving from the electronic communication device 200, the biometric information associated with the user for verifying the authenticity of the user after transmitting the signal to the electronic communication device 200, as illustrated in FIG. 5, FIG. 7A and FIG. 7B. In one embodiment, the biometric information may include the voice signature from the user.

At step 304, the method 300 may include verifying the authenticity of the user based on verification of the biometric information with user data stored in the database in communication with the access reader 100, as illustrated in FIG. 5 and FIG. 7B.

At step 305, the method 300 may include determining whether the received biometric information associated with the user matches the stored biometric information, in the database, associated with the user, as illustrated in FIG. 5 and FIG. 7B.

At step 306, the method 300 may include no access in response to determining that the received biometric information associated with the user does not match the stored biometric information.

At step 307, the method 300 may include triggering the command to provide access to the user in response to determining that the received biometric information associated with the user matches the stored biometric information, as illustrated in FIG. 5 and FIG. 7B.

At step 308, the method 300 may include recording the access log associated with the verification of the authenticity of the user in the database, as illustrated in FIG. 5 and FIG. 7B.

At step 309, the method 300 may include establishing the secure wireless communication link with the electronic communication device 200, as illustrated in FIG. 5 and FIG. 7B.

Figure 4:
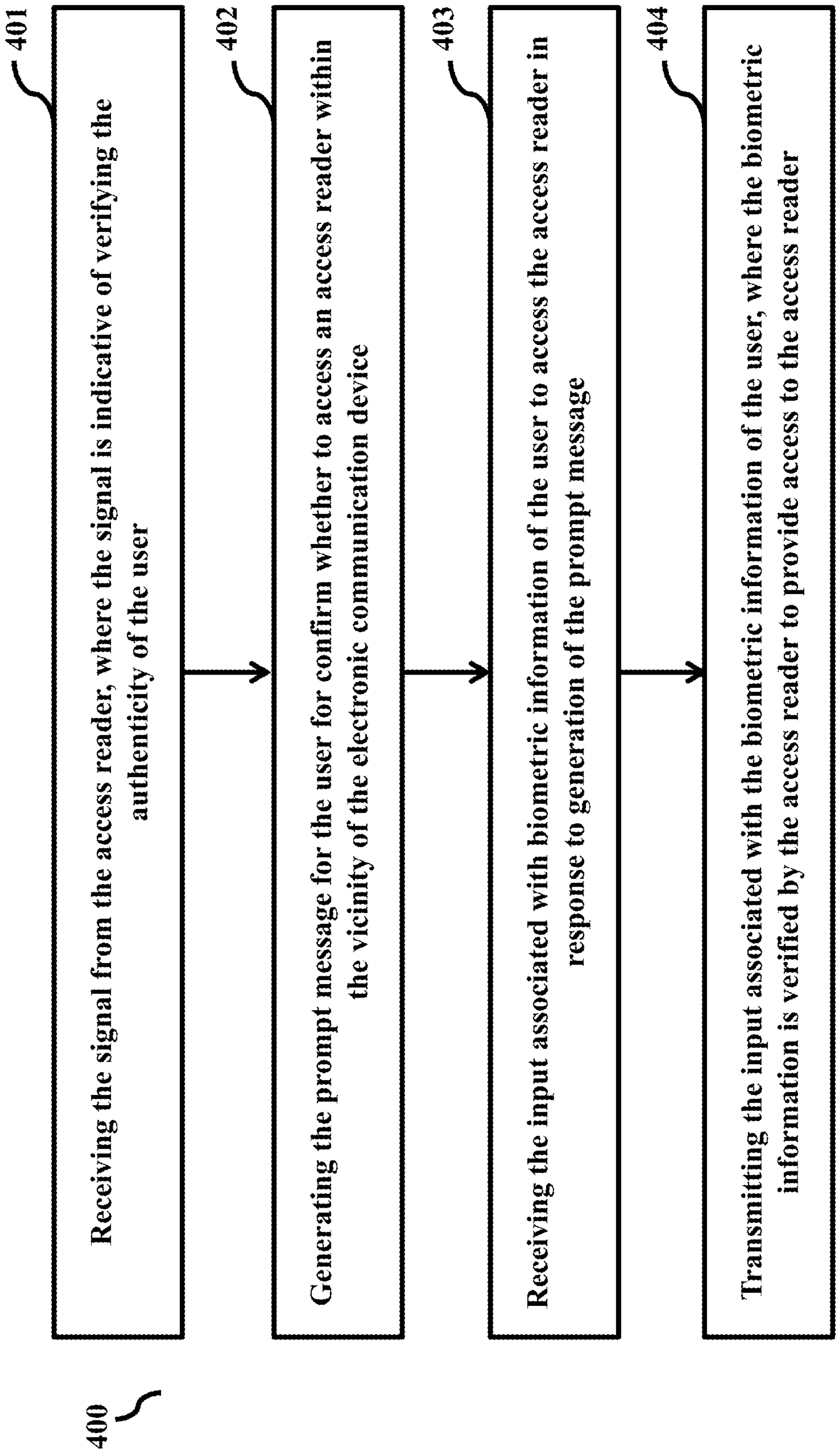
FIG. 4 is a flow diagram illustrating the method at the electronic communication device for verifying user authenticity in the access control system.

FIG. 4 is a flow diagram 400 illustrating the method at the electronic communication device 200 for verifying user authenticity in the access control system. Steps (401 to 404) may be performed by the electronic communication device 200 to verify the authenticity of the user in the access control system.

At step 401, the method 400 may include receiving the signal from the access reader 100, where the signal is indicative of verifying the authenticity of the user, as illustrated in FIG. 5 and FIG. 7B.

At step 402, the method 400 may include generating the prompt message for the user to confirm whether to access the access reader 100 within the vicinity of the electronic communication device 200, as illustrated in FIG. 5 and FIG. 7B. In one embodiment, prior to generating the prompt message, the method 400 may include receiving the signal from the access reader 100 based on reception of one of the command received from the user or the electronic communication device 200, associated with the user, present within the predefined threshold distance from the access reader 100, wherein the signal is indicative of verifying the authenticity of the user.

At step 403, the method 400 may include receiving the input associated with the biometric information of the user to access the access reader 100 in response to the generation of the prompt message, as illustrated in FIG. 5 and FIG. 7B. In one embodiment, the method 400 may include receiving the input from the user to access the access reader 100 comprises receiving the identity of the access reader 100, from among the plurality of access readers (100*n*).

At step 404, the method 400 may include transmitting the input associated with the biometric information of the user, where the biometric information is verified by the access reader 100 to provide access to the access reader 100, as illustrated in FIG. 5 and FIG. 7B. In one embodiment, the method 400 may include establishing the secure wireless communication link with the access reader 100, wherein the wireless communication link is one of the Bluetooth or Ultra-wideband communication link.

FIG. 5 is an example sequence diagram illustrating the method for verifying user authenticity in the access control system 500.

At step 501, the access reader 100 may detect the user 200A is in proximity to the access reader based on the command/mobile command (e.g., the voice command "open the door") received from the user 200A and/or the electronic communication device 200 associated with the user 200A, when the user 200A is present within the predefined threshold distance from the access reader 100, which relates to step 301 of FIG. 3. At step 502, the access reader 100 may transmit the signal to the electronic communication device 200 in response to detecting that the user 200A is in proximity to the access reader 100, where the signal is indicative of verifying the authenticity of the user 200A, which relates to step 302 of FIG. 3.

At step 503, the electronic communication device 200 may generate the prompt message (e.g., a message displayed on a screen of the electronic communication device 200 "Please enter your registered information for validation", a voice message "provide a password to open the door") for the user 200A to confirm whether or not to access the access reader 100 located near the electronic communication device 200, which relates to step 402 of FIG. 4. In response to the prompt message, the electronic communication device 200 receives input (e.g., voice signature) associated with the user's biometric information to access the access reader 100, which relates to step 403 of FIG. 4. At step 504, the electronic communication device 200 then may transmit the input associated with the biometric information of the user 200A to the database (e.g., cloud database 500B) for verifying the authenticity of the user 200A, which relates to step 404 of FIG. 4.

At step 505, the cloud database 500B may determine whether the received biometric information associated with the user 200A matches the stored biometric information associated with the user 200A, which relates to step 305 of FIG. 3. The cloud database 500B may trigger the command to provide access to the user 200A in response to determining that the received biometric information associated with the user 200A matches the stored biometric information (i.e., valid user), which relates to step 307 of FIG. 3. Further, the cloud database 500B may record the access log associated with the verification of authenticity of the user 200A at the cloud database 500B, which relates to step 308 of FIG. 3. Then, the secure wireless communication link establishes between the access reader 100 and the electronic communication device 200, which relates to step 309 of FIG. 3.

At step 506, the electronic communication device 200 may send a message signal to access the access reader 100 to the user 200A. Example of the message signal includes, but not limited to a message displayed on the screen of the electronic communication device 200 "Please enter door identity/door number", a voice message "provide a door identity", a voice message "would you like to open door-100A or 100B or 100N?", etc., which relates to step 403 of FIG. 4. At step 507, the access reader 100 may receive the message signal from the user 200A via the electronic communication device 200. Example of the received message signal includes, but not limited to a message displayed on the screen of the electronic communication device 200 "Please confirm by pressing the OK button", a voice message "please open the door-100A", etc., which relates to step 403 of FIG. 4 At step 508, the access reader 100 may trigger the command to provide access to the user 200A based on the verification of the authenticity of the user 200A and the received message. The access reader 100 triggers the command, to building space/door 500A, to provide access to the user 200A based on the verification of the authenticity of the user 200A and the received message, which relates to step 309 of FIG. 3. At step 509, the access reader 100 may record the access log associated with the verification of the authenticity of the user 200A in the cloud database 500B, which relates to step 308 of FIG. 3.

Figure 6:
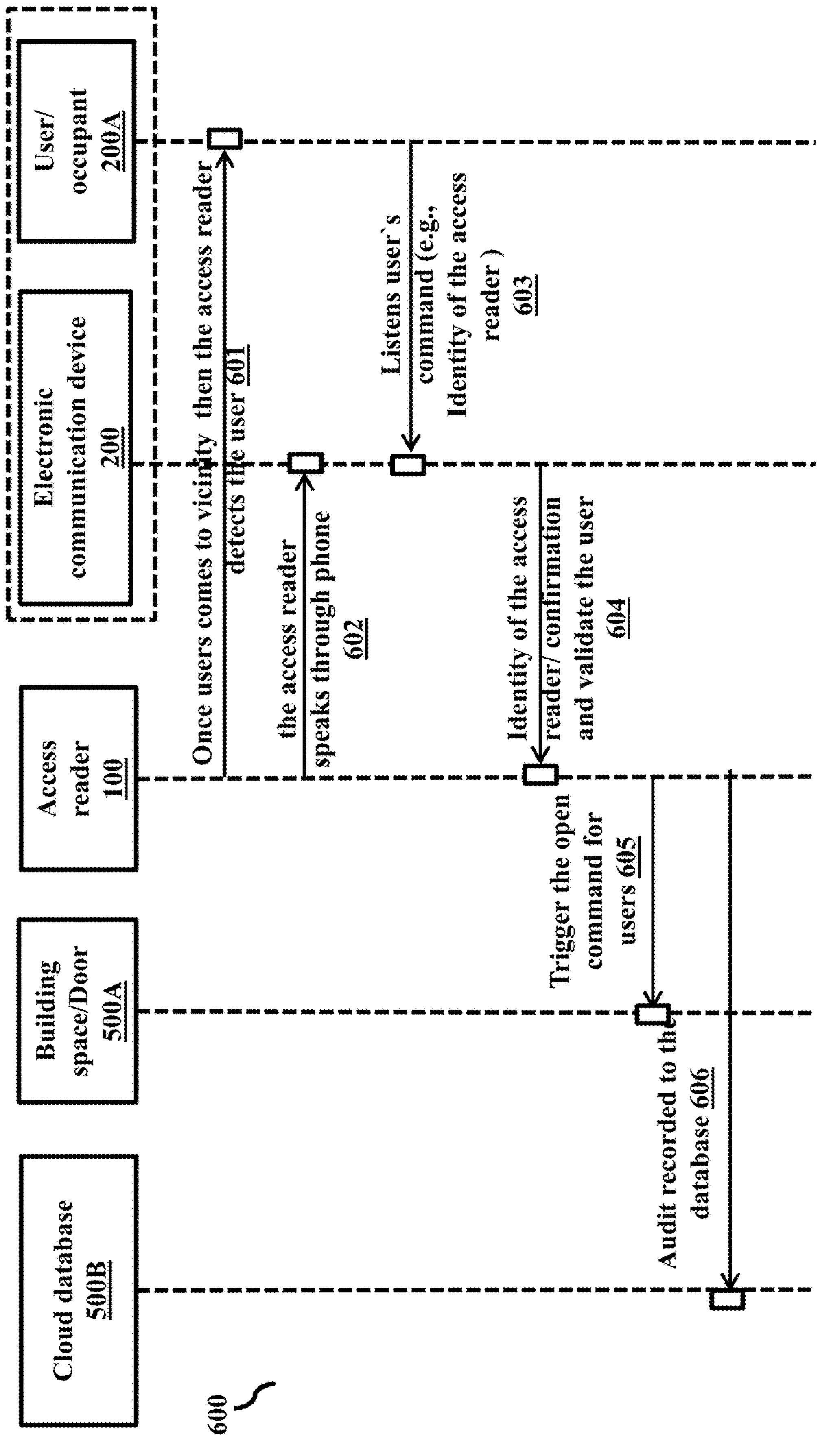
FIG. 6 is another example sequence diagram illustrating the method for verifying user authenticity in the access control system.

FIG. 6 is another example sequence diagram illustrating the method for verifying user authenticity in the access control system 600.

At steps 601-602, the access reader 100 may detect the user 200A is in proximity to the access reader 100 based on the command/mobile command (e.g., the voice command "open the door") received from the user 200A and/or the electronic communication device 200 associated with the user 200A when the user 200A is present within the predefined threshold distance from the access reader 100, which relates to step 301 of FIG. 3. The access reader 100 speaks to the user 200A via the electronic communication device 200 (e.g., an application associated with mobile credential access control). At step 603, the electronic communication device 200 may receive the input (e.g., biometric information, the identity of the access reader 100, etc.) from the user 200A (e.g., a voice message/signature "please open the door-100A"), which relates to step 403 of FIG. 4. At steps 604-605, the electronic communication device 200 may send the received input to the access reader 100, which relates to step 404 of FIG. 4. The access reader 100 then verifies the received input by utilizing the cloud database 500B and the cloud database 500B triggers the command to provide access to the user 200A when the received biometric information associated with the user 200A matches the stored biometric information (i.e., valid user), which relates to step 305 of FIG. 3. Then, the access reader 100 may trigger the command, which relates to step 307 of FIG. 3, to building space/door 500A, to provide access to the user 200A based on the verification of the authenticity of the user 200A and the received message and the secure wireless communication link establishes between the access reader 100 and the electronic communication device 200, which relates to step 309 of FIG. 3. At step 606, the access reader 100 may record the access log associated with the verification of the authenticity of the user 200A in the cloud database 500B, which relates to step 308 of FIG. 3.

The various actions, acts, blocks, steps, or the like in the flow/sequence diagrams may be performed in the order presented, in a different order, or simultaneously. Further, in some embodiments, some of the actions, acts, blocks, steps, or the like may be omitted, added, modified, skipped, or the like without departing from the scope of the invention.

FIGS. 7A-7B is an exemplary scenario illustrating the method for verifying user authenticity in the access control system 1000.

Referring to FIG. 7A: at an initial stage, the user 200A of the electronic communication device 200 may pair 701 with the access reader 100 by using various technologies of the electronic communication device 200, where the access reader 100 mounted on door/wall 500A (building space/door). Examples of the various technologies include, but not limited to, first technology as Bluetooth and second technology as WI-FI, etc. Furthermore, the user 200A registers 702 the biometric information with the access reader 100 and/or the cloud database 500B. Examples of biometric information include, but not limited to, first biometric as voice signature, second biometric as fingerprint, etc. Furthermore, the access reader 100 of the door 100A may include various sensors(s) 141 to capture sensor data, and the input device(s) and the output device(s). Examples of the sensors(s) 141 include, but not limited to, the camera 703, the microphone 704, the biometric sensor 705, the audio sensor 706, and the proximity sensor (not shown in FIG. 7A). Examples of the input device(s) include, but not limited to, a keypad 707. Examples of the output device(s) include, but not limited to, a display 708.

Referring to FIG. 7B: The access reader 100 may detect the user 200A is in proximity to the access reader 100 based on the command/mobile command (e.g., the voice command "open the door") received from the user 200A and/or the electronic communication device 200 associated with the user 200A when the user 200A is present within the predefined threshold distance ((1)) from the access reader 100, which relates to step 501 of FIG. 5. The access reader 100 may transmit the signal ((2)) to the electronic communication device 200 in response to detecting that the user 200A is in proximity to the access reader 100, where the signal is indicative of verifying the authenticity of the user 200A, which relates to step 502 of FIG. 5.

The electronic communication device 200 may generate a prompt message ((3)) (e.g., a message displayed 709 on a screen of the electronic communication device 200 "Please enter your registered information for validation", a voice message "provide a password to open the door") for the user 200A to confirm whether or not to access the access reader 100 located near the electronic communication device 200, which relates to step 503 of FIG. 5. In response to the prompt message, the electronic communication device 200 may receive input (e.g., voice signature) associated with the user's biometric information to access the access reader 100, which relates to step 503 of FIG. 5. The electronic communication device 200 then may transmit ((4)) the input associated with the biometric information of the user 200A to the database (e.g., cloud database 500B) for verifying ((5)) the authenticity of the user 200A, which relates to step 504 of FIG. 5. The cloud database 500B determines whether the received biometric information associated with the user 200A matches the stored biometric information associated with the user 200A, which relates to step 505 of FIG. 5. The cloud database 500B may trigger the command to provide access to the user 200A in response to determining that the received biometric information associated with the user 200A matches the stored biometric information (i.e., valid user), which relates to step 505 of FIG. 5. Further, the cloud database 500B may record the access log associated with the verification of authenticity of the user 200A at the cloud database 500B. Then, the secure wireless communication link may establish between the access reader 100 and the electronic communication device 200.

The electronic communication device 200 may send a message signal ((6)) to access the access reader 100 to the user 200A, which relates to step 506 of FIG. 5. Example of the message signal includes, but not limited to a message displayed 710 on the screen of the electronic communication device 200 "Please enter door identity/door number", a voice message "provide a door identity", a voice message "would you like to open door-100A or 100B or 100N?", etc. The access reader 100 may receive the message signal ((7)) from the user 200A via the electronic communication device 200. Example of the received message signal includes, but is not limited to, a message displayed on the screen of the electronic communication device 200 "Please confirm by pressing the OK button", a voice message "please open the door-100A", etc., which relates to step 507 of FIG. 5. The access reader 100 may trigger the command to provide access to the user 200A based on the verification of the authenticity of the user 200A and the received message, which relates to step 508 of FIG. 5. The access reader 100 then may record ((5)) the access log associated with the verification of the authenticity of the user 200A in the cloud database 500B, which relates to step 509 of FIG. 5.

Unlike existing methods and systems, the disclosed method/system uses the electronic communication device 200 (e.g., mobile phones, smartphones, tablets, wearable electronic devices, and so on) and allows the electronic communication device 200 to serve as a user's credentials to gain access to, for example, offices or other business facilities or any organization. As more employers/users promote the Bring Your Own Device (BYOD) trend, the disclosed method/system shall provide a mechanism for adding an extra layer of security to any organization. Further, by using the cloud-based encrypted technology, the disclosed method/system provides secure access to, for example, offices or other business facilities with just a few clicks on the electronic communication device 200 and ensures a higher level of security. Furthermore, the disclosed method/system also detects and prevents tailgating. Furthermore, the disclosed method/system provides a low-cost solution for efficiently managing user credentials identification. Because of its simplicity and ease of use, the disclosed method/system is an undeniably promising alternative to physical cards/expensive biometric readers for verifying the user's authenticity.

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method at an access reader for verifying authenticity of a user, the method comprising:

detecting, by the access reader, that the user is in proximity to the access reader based on a voice command received at the access reader from the user and the detection of an electronic device associated with the user that is present within a predefined threshold distance from the access reader, the voice command including a command to open a door;

transmitting from the access reader to the electronic communication device a signal in response to detecting that the user is in proximity to the access reader, wherein the signal is indicative of verifying the authenticity of the user;

receiving, at the access reader and from the electronic communication device, biometric information associated with the user for verifying the authenticity of the user after transmitting the signal to the electronic communication device, wherein the biometric information was generated by the electronic communication device in response to receiving the signal from the access device, including:

generating, at a display screen of the electronic communication device, a prompt message for the user to confirm whether to access the access reader; and receiving, at the electronic communication device, an input from the user provided in response to the generation of the prompt message, the input from the user associated with biometric information of the user comprising a voice signature of the user confirming access to the access reader is being requested; and verifying, by the access reader, the authenticity of the user based on verification of the biometric information with user data stored in a database in communication with the access reader.

2. The method of claim 1, further comprising: triggering a command to provide access to the user based on the verification of the authenticity of the user.

3. The method of claim 1, further comprising: recording, by the access reader at the database, an access log associated with the verification of the authenticity of the user.

4. The method of claim 1, further comprising: establishing a secure wireless communication link with the access reader, wherein the wireless communication link is one of a Bluetooth communication link, Ultra-wideband communication link, or another near-field communication link.

5. The method of claim 1, wherein receiving the biometric information comprises receiving the voice signature from the user.

6. A system at an access reader for verifying authenticity of a user, the system comprising:

an access control engine configured to:

detect, by the access reader, that the user is in proximity to the access reader based on a voice command received at the access reader from the user and the detection of an electronic device associated with the user that is present within a predefined threshold distance from the access reader, the voice command including a command to open a door;

transmit a signal from the access reader to the electronic communication device in response to detecting that the user is in proximity to the access reader, wherein the signal is indicative of verifying the authenticity of the user;

receive, at the access reader and from the electronic communication device, biometric information associated with the user for verifying the authenticity of the user after transmitting the signal to the electronic communication device, wherein the biometric information was generated by the electronic communication device in response to receiving the signal from the access device, including:

generating, at a display screen of the electronic communication device, a prompt message for the user to confirm whether to access the access reader; and receiving, at the electronic communication device, an input from the user provided in response to the generation of the prompt message, the input from the user associated with biometric information of the user comprising a voice signature of the user confirming access to the access reader is being requested; and verify the authenticity of the user based on verification of the biometric information with user data stored in a database in communication with the access reader.

7. The system of claim 6, wherein the access control engine is further configured to: trigger a command to provide access to the user based on the verification of the authenticity of the user.

8. The system of claim 6, wherein the access control engine is further configured to: record, by the access reader at the database, an access log associated with the verification of the authenticity of the user.

9. The system of claim 6, wherein the access control engine is further configured to: establish a secure wireless communication link with the access reader, wherein the wireless communication link is one of a Bluetooth communication link, Ultra-wideband communication link, or another near-field communication link.

10. The system of claim 6, wherein to receive the biometric information, the access control engine is further configured to receive the voice signature from the user.

11. A method at an electronic communication device for verifying authenticity of a user, the method comprising:

receiving, at the electronic communication device, a signal transmitted from a access reader in respond to the access reader detecting that the electronic communication device is in proximity to the access reader and based on a voice command received at the access reader from the user, the voice command including a command to open a door, and wherein the signal is indicative of verifying the authenticity of the user;

generating, at a display screen of the electronic communication device and in response to receiving the signal from the access device, a prompt message for the user to confirm whether to access the access reader within a vicinity of the electronic communication device;

receiving, at the electronic communication device, an input associated with biometric information of the user comprising a voice signature of the user to access the access reader in response to the generation of the prompt message; and transmitting, from the electronic communication device to a cloud database for verifying the authenticity of the user, the input associated with the biometric information of the user, wherein the biometric information is verified by the database and provided to the access reader in order to provide the user with access to the access reader.

12. The method of claim 11, wherein receiving the input from the user to access the access reader comprises receiving an identity of the access reader, from among the plurality of access readers.

13. The method of claim 11, further comprising: establishing a secure wireless communication link with the access reader, wherein the wireless communication link is one of a Bluetooth or Ultra-wideband communication link.

14. A system at an electronic communication device for verifying authenticity of a user, the system comprising: an access control engine configured to:

receive, at the electronic communication device, a signal transmitted from a access reader in respond to the access reader detecting that the electronic communication device is in proximity to the access reader and based on a voice command received at the access reader from the user, the voice command including a command to open a door, and wherein the signal is indicative of verifying the authenticity of the user;

generate, at a display screen of the electronic communication device and in response to receiving the signal from the access device, a prompt message for the user to confirm whether to access the access reader within a vicinity of the electronic communication device;

receive, at the electronic communication device, an input associated with biometric information of the user comprising a voice signature of the user to access the access reader in response to the generation of the prompt message; and transmit, from the electronic communication device to a cloud database for verifying the authenticity of the user, the input associated with the biometric information of the user, wherein the biometric information is verified by the database and provided to the access reader in order to provide the user with access to the access reader.

15. The system of claim 14, wherein to receive the input from the user to access the access reader, the access control engine is configured to receive an identity of the access reader, from among the plurality of access readers.

16. The system of claim 14, wherein the access control engine is configured to:

establish a secure wireless communication link with the access reader, wherein the wireless communication link is one of a Bluetooth or Ultra-wideband communication link.

* * * * *